United States Patent
Grebennikov et al.

(10) Patent No.: US 11,914,724 B2
(45) Date of Patent: Feb. 27, 2024

(54) SYSTEMS AND METHODS FOR ADJUSTING DATA PROTECTION LEVELS BASED ON SYSTEM METADATA

(71) Applicant: Acronis International GmbH, Schaffhausen (CH)

(72) Inventors: Nikolay Grebennikov, Moscow (RU); Candid Wüest, Bassersdorf (CH); Serguei Beloussov, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 248 days.

(21) Appl. No.: 17/555,462

(22) Filed: Dec. 19, 2021

(65) Prior Publication Data

US 2022/0207160 A1    Jun. 30, 2022

Related U.S. Application Data

(60) Provisional application No. 63/130,531, filed on Dec. 24, 2020.

(51) Int. Cl.
  *G06F 21/60*    (2013.01)
  *G06F 21/56*    (2013.01)

(52) U.S. Cl.
  CPC .......... *G06F 21/604* (2013.01); *G06F 21/566* (2013.01); *G06F 21/602* (2013.01); *G06F 2221/034* (2013.01); *G06F 2221/2113* (2013.01)

(58) Field of Classification Search
  CPC .... G06F 21/604; G06F 21/566; G06F 21/602; G06F 2221/034; G06F 2221/2113
  See application file for complete search history.

(56) References Cited

U.S. PATENT DOCUMENTS

| | | | |
|---|---|---|---|
| 8,782,435 B1 * | 7/2014 | Ghose | H04L 9/3247 |
| | | | 712/216 |
| 11,575,704 B2 * | 2/2023 | MacLeod | H04L 63/0236 |
| 11,775,639 B2 * | 10/2023 | Collier | G06F 21/566 |
| | | | 726/22 |
| 2021/0382740 A1 * | 12/2021 | Hoogerbrugge | G06F 12/1441 |
| 2022/0207160 A1 * | 6/2022 | Grebennikov | G06F 21/602 |

FOREIGN PATENT DOCUMENTS

| | | | | |
|---|---|---|---|---|
| WO | WO-2018127794 A1 * | 7/2018 | | G06F 21/54 |
| WO | WO-2022090840 A1 * | 5/2022 | | G06F 21/552 |

* cited by examiner

*Primary Examiner* — Meng Li

(74) *Attorney, Agent, or Firm* — ArentFox Schiff LLP; Michael Fainberg (57) ABSTRACT

Disclosed herein are systems and method for adjusting data protection levels based on system metadata. A method may include monitoring a computing device for a cyberattack, wherein a kernel driver of the computing device is configured to allow access to kernel control paths and hash tables in accordance with a first protection level, and detecting that the cyberattack is in progress. While the cyberattack is in progress, the method may include identifying kernel control paths and hashes of software objects that will be affected by the cyberattack, and configuring the kernel driver to disable access to the identified kernel control paths and hashes of the software objects in accordance with a second protection level, wherein the second protection level includes greater access restrictions to the computing device than the first protection level.

17 Claims, 3 Drawing Sheets

SYSTEMS AND METHODS FOR ADJUSTING DATA PROTECTION LEVELS BASED ON SYSTEM METADATA

CROSS-REFERENCE TO RELATED APPLICATIONS

This application claims the benefit of U.S. Provisional Application No. 63/130,531, filed Dec. 24, 2020, which is herein incorporated by reference.

FIELD OF TECHNOLOGY

The present disclosure relates to the field of data security, and, more specifically, to systems and methods for adjusting data protection levels based on system metadata.

BACKGROUND

A conventional security system is typically configured to detect a cyberattack (e.g., via an anti-virus software program), identify the effected files, and attempt to remove/quarantine the cyberattack. While this indicates that the system has reacted to the cyberattack and removed it, it does not necessarily mitigate the damage done by the cyberattack.

In the event of a cyberattack, the balance between system protection and usability should be shifted at least temporarily towards an increased level of protection, even if this leads to reduced user-friendliness. Conventional security systems are not designed to modify such protection levels dynamically. For example, a security system may either not adjust protection levels or enter a lockdown mode, which is too restrictive to be used permanently.

There thus exists a need to monitor and adjust protection levels efficiently during an ongoing cyberattack.

SUMMARY

In one exemplary aspect, the techniques described herein relate to a method for adjusting data protection levels based on system metadata, the method including: monitoring a computing device for a cyberattack, wherein a kernel driver of the computing device is configured to allow access to kernel control paths and hash tables in accordance with a first protection level; detecting that the cyberattack is in progress; while the cyberattack is in progress, identifying kernel control paths and hashes of software objects that will be affected by the cyberattack; configuring the kernel driver to disable access to the identified kernel control paths and hashes of the software objects in accordance with a second protection level, wherein the second protection level includes greater access restrictions to the computing device than the first protection level.

In some aspects, the techniques described herein relate to a method, wherein the kernel driver is configured to follow restrictions of the second protection level for a threshold period of time, further including: reconfiguring the kernel driver to enable access to the identified kernel control paths and hashes of the software objects in accordance with the first protection level after the threshold period of time has elapsed.

In some aspects, the techniques described herein relate to a method, further including: training a machine learning algorithm, using a dataset of previous cyberattacks of varying attack timelines, to determine the threshold period of time based on a type of the cyberattack.

In some aspects, the techniques described herein relate to a method, further including: identifying a backup of the computing device that was performed prior to the cyberattack; and configuring the kernel driver to disable access to kernel control paths and hashes that are not included in the backup in accordance with a third protection level that includes greater access restrictions to the computing device than the second protection level.

In some aspects, the techniques described herein relate to a method, wherein monitoring the computing device for the cyberattack includes executing a machine learning algorithm configured to compare attributes of the computing device to cyberattack profiles and utilize a comparison threshold to evaluate whether the computing device is under attack.

In some aspects, the techniques described herein relate to a method, wherein the second protection level decreases the comparison threshold of the machine learning algorithm to detect additional irregularities in the computing device caused by the cyberattack and/or other cyberattacks.

In some aspects, the techniques described herein relate to a method, further including: performing a security action to stop the cyberattack; determining whether the identified kernel control paths and hashes of the software objects affected by the cyberattack have been normalized; and in response to determining that the identified kernel control paths and hashes of the software objects have been normalized, reconfiguring the kernel driver to enable access to the identified kernel control paths and hashes of the software objects in accordance with the first protection level.

In some aspects, the techniques described herein relate to a method, wherein the first protection level enables full permissions to access to all files in a directory of the computing device, the second protection level disables writing permissions to the files in the directory, and a third protection level disables reading and writing permissions to the files.

It should be noted that the methods described above may be implemented in a system comprising a hardware processor. Alternatively, the methods may be implemented using computer executable instructions of a non-transitory computer readable medium.

In some aspects, the techniques described herein relate to a system for adjusting data protection levels based on system metadata, including: a memory; and a hardware processor communicatively coupled with the memory and configured to: monitor a computing device for a cyberattack, wherein a kernel driver of the computing device is configured to allow access to kernel control paths and hash tables in accordance with a first protection level; detect that the cyberattack is in progress; while the cyberattack is in progress, identify kernel control paths and hashes of software objects that will be affected by the cyberattack; configure the kernel driver to disable access to the identified kernel control paths and hashes of the software objects in accordance with a second protection level, wherein the second protection level includes greater access restrictions to the computing device than the first protection level.

In some aspects, the techniques described herein relate to a non-transitory computer readable medium storing thereon computer executable instructions for adjusting data protection levels based on system metadata, including instructions for: monitoring a computing device for a cyberattack, wherein a kernel driver of the computing device is configured to allow access to kernel control paths and hash tables in accordance with a first protection level; detecting that the cyberattack is in progress; while the cyberattack is in progress, identifying kernel control paths and hashes of software objects that will be affected by the cyberattack; configuring the kernel driver to disable access to the identified kernel control paths and hashes of the software objects in accordance with a second protection level, wherein the second protection level includes greater access restrictions to the computing device than the first protection level.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for adjusting data protection levels based on system metadata. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

To address the shortcomings discussed in the background, the present disclosure presents systems and methods in which an ongoing attack is detected (e.g., based on an anti-virus program, an alert from Acronis' Cyber Protection Operation Center (CPOC), sensor data, etc.) and a dynamic protection hardening mode is activated. This hardening mode uses system metadata to temporarily adjust the protection level of the system. For example, the mode may only allow applications from previous backups to run, or may decrease a threshold for artificial intelligence (AI)-based detection models for a set period of time to catch more irregularities and errors in the system. After this period of time and/or as the system metadata changes, the protection levels may be adjusted. For example, after the period of time has elapsed, the system may revert back to a normal mode of operation.

Figure 1:
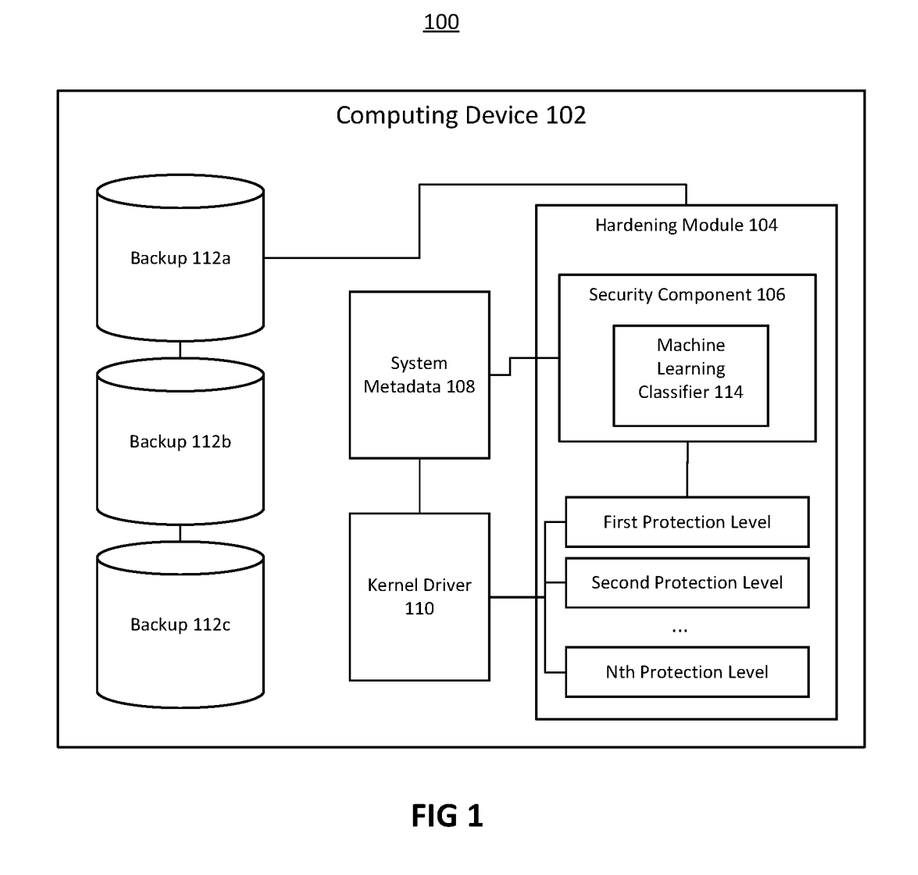
FIG. 1 is a block diagram illustrating a system for adjusting data protection levels based on system metadata.

FIG. 1 is a block diagram illustrating system 100 for adjusting data protection levels based on system metadata. System 100 comprises computing device 102, which may be any computer device such as a desktop, laptop, server, smartphone, etc. Hardening module 104 may be a software program that is configured to adjust protection levels on computing device 102 (e.g., first protection level, second protection level, . . . Nth protection level). In some aspects, hardening module 104 is part of a security software program such as an anti-virus software program. In other aspects, hardening module 104 is a standalone software program. It should also be noted that although hardening module 104 is shown as being installed on computing device 102, hardening module 104 may instead be installed on a different computing device (e.g., a server) that remotely monitors computing device 102 (e.g., via a network such as the Internet). In some implementations, hardening module 104 may comprise a thin client installed on computing device 102 and a thick client installed on the different computing device.

Computing device 102 comprises kernel driver 110. A kernel of computing device 102 is a computer program that has control over the functionality of computing device 102. The kernel is typically provided protected space separate from system memory that is inaccessible to applications on computing device 102. Kernel driver 110 is code that has the ability to access the kernel API and memory directly. Kernel driver 110 may thus be used to control access to files (e.g., via password protection, hiding), control access to non-standard file systems and devices, etc.

Kernel driver 110 may, for example, control access to system metadata 108. System metadata 108 may include kernel control paths and hashes. A kernel control path is a sequence of instructions executed by the kernel to handle a system call, an exception, or an interrupt on computing device 102. Hashes of files may be stored in hash tables, which are used in the kernel for storing many high-usage data objects (e.g., pages, buffers, inodes, etc.).

In an exemplary aspect, a method for adjusting data protection levels based on system metadata may involve the following. Security component 106 may be configured to monitor computing device 102 for a cyberattack (e.g., malware, virus, ransomware, worm, hack, etc.), wherein kernel driver 110 of computing device 102 is configured to allow access to system metadata 108 (i.e., kernel control paths and hash tables) in accordance with a first protection level. Each protection level may represent a plurality of policies indicating which paths and hashes are accessible. The first protection level may be the most basic form of protection (relative to the other protection levels) such that all default settings or manually changed user settings on computing device 102 are implemented.

Security component 106 may subsequently detect that a cyberattack is in progress. There may be multiple types of cyberattacks. For example, ransomware involves the encryption of multiple files, spyware involves monitoring user actions and gathering potentially confidential information, adware involves the generation of several pop-ups, etc. In general, a cyberattack will cause abnormal activity on the computing device. In the case of ransomware, files that are never encrypted may get encrypted without user consent. In the case of spyware, an additional data stream that is normally never transmitted, may be uploaded to an unidentified address. In the case of adware, the user may begin to close several windows in the a short period of time. Security component 106 may thus monitor for abnormal activity on the computing device and then assess whether the abnormal activity is comparable to malicious activity corresponding to known cyberattacks.

For example, security component 106 may detect that a threshold number of files (e.g., 10) on computing device 102 has been encrypted in a threshold period of time (e.g., 10 seconds). Security component 106 may evaluate whether the files are normally encrypted (e.g., based on historic usage behavior of the user of computing device 102 or based on an average user behavior that is pre-programmed into security component 106 using data gathered from several users of computing devices similar to computing device 102). For example, computing device 102 may be a laptop running an operating system such as Windows 11. During a cyberattack, several files on computing device 102 may begin to get encrypted. If the threshold number of files (e.g., 10) is encrypted within a threshold period of time (e.g., 10 seconds), security component 106 may flag that behavior as abnormal. In some aspects, this is enough of a motivation to increase security and security component 106 may adjust protection levels accordingly. In some aspects, security component 106 may perform a secondary check. For example, security component 106 may determine whether the same files were encrypted in other computing devices running Windows 11 during a cyberattack. In another example, security component 106 may determine the source of the encryption command (e.g., is it coming from a script from an unauthorized entity). Based on these checks, security component 106 may confirm that the cyberattack is ransomware. Under normal circumstances without protection, the cyberattack may continue as additional files are encrypted. This makes the cyberattack an "ongoing" cyberattack.

In a different scenario featuring adware, the pop-up of a threshold number of pop-ups within a threshold period of time and/or the user closing a threshold number of user interface windows within the threshold period of time may be an indication of abnormal behavior. Security component 106 may detect this behavior and flag it as abnormal behavior. Security component 106 may then perform a secondary check. For example, security component 106 may determine whether the pop-ups are linked to known malicious sites. Again, this cyberattack is considered ongoing because additional pop-ups may appear if the cyberattack is not addressed.

While the cyberattack is in progress, security component 106 may identify kernel control paths and hashes of software objects affected by the cyberattack. For example, security component 106 may identify files that have been deleted or modified (e.g., encrypted) by the cyberattack. To prevent other similar files on computing device 102 from being targeted, security component 106 may configure kernel driver 110 to disable access to kernel control paths and hashes of software objects in accordance with a second protection level (e.g., disabling file write permission to system programs folder (C:\Program Files), blocking creation of new local users, blocking any PowerShell process from starting). The second protection level may include more access restrictions to computing device 102 than the first protection level. This prevents the cyberattack from expanding its reach and thus mitigates potential damage done on computing device 102. For example, in the second protection level, kernel driver 110 may block/suspend a particular kernel control path, which would cause the kernel can switch to another control path to perform a certain task.

Each protection level may identify a set of paths and hashes to restrict access to. As hardening module 104 increases a protection level (e.g., from the first to second, second to third, third to Nth, etc.), the amount of restrictions increases as well. For example, under level 1, there may be full file access to files in user document folder (\Documents). Under level 2, there may be only read access to files in user document folder and no write access. Under level 3, there may be neither read nor write access to files in user document folder. While this may reduce functionality from the user's perspective, in some aspects, kernel driver 110 may be configured to follow restrictions of the second protection level for a threshold period of time only (e.g., 1 hour). Hardening module 104 may then reconfigure kernel driver 110 to enable access to the disabled kernel control paths and hashes of the software objects back in accordance with the first protection level after the threshold period of time has elapsed. This maintains a balance between user functionality and system security.

In some aspects, security component 106 utilizes a machine learning algorithm (e.g., machine learning classifier 114) to identify a cyberattack and determine an amount of time to maintain a higher protection level. In some aspects, both of these techniques are performed by a single machine learning algorithm that is trained using a dataset comprising behavior attributes (e.g., identifiers of files that are encrypted such as name, size, extension, directory, etc., a time of encryption, a verdict of whether the behavior is associated with a cyberattack, and a time when the cyberattack ended (i.e., when the encryption ended for all files attacked). For example, a particular cyberattack may involve the encryption of 200 files within 10 minutes. If the current attack is classified as that particular cyberattack, the amount of time that the higher protection level will be maintained is at least 10 minutes. In some cases, an additional threshold amount of time may be added as well to prevent the cyberattack from continuing after the protection level is reduced. Ultimately, the threshold period of time that the higher protection level needs to be maintained should be enough to block the attack and place the computing device in a safe state.

In some aspects, the machine learning algorithm for identifying the cyberattack is different than the machine learning algorithm that determines an amount of time to maintain a higher protection level. For example, security component 106 may training a machine learning algorithm, using a dataset of previous cyberattacks of varying attack timelines, to determine the threshold period of time based on a type of the cyberattack. For example, the dataset may identify a particular type of adware, may include identifiers of the adware (e.g., associated name, scripts, source, etc.), and may include a time the adware was detected and a time the adware was done with its attack (e.g., removed).

It should be noted that security component 106 may escalate the protection level even higher if after adjust the protection level a first time, the cyberattack continues. For example, if the protection level is raised from a first protection level to a second protection level, but more files continue to be encrypted at the same rate or pop-ups continue to be generated at the abnormal rate, security component 106 may raise the protection level from a second protection level to a third protection level.

In some aspects, security component 106 may select a protection level based on the type of cyberattack. For example, security component 106 may determine a danger level of the cyberattack and determine an appropriate level of protection. The danger level may be a predetermined value that is found in a profile of the cyberattack (e.g., virus definitions). In another example, security component 106 may identify a type of files that the cyberattack targets (e.g., based on a cyberattack profile), and select a protection level that restricts access to those files. In an example, if there is malware or an attack detected that aims at stealing cryptocurrency wallets from various programs, the kernel driver could then prevent read access to any file with ".wallet" extension, or to a predefined list of known wallet files from various tools. Whenever a file is opened for access, the kernel driver can decide to decline this access. The kernel driver can even be more granular and block all access to files except by a known application, which had accessed this file in the past or is authorized to do so. Thus, a behavior pattern for an application can be applied, which knows which application open said files. If a script attempts to modify a text file, the script may be blocked. If a known text editor attempts to modify the text file, the modification may be allowed.

In situations where the cyberattack is new (i.e., security component 106 does not know how it behaves, but can determine that it is a cyberattack because of failed functionality in computing device 102), security component 106 may generate customized protection level policies.

In some aspects, hardening module 104 may generate a protection level policy (e.g., a third protection level) based on backups of computing device 102. As shown in system 100, computing device 102 has three backups (112a, 112b, 112c). Backup 112a may be generated at time t1, 112b may be generated at time t2, 112c may be generated at time t3. Hardening module 104 may determine a time when the cyberattack was detected (e.g., time t4). Hardening module 104 may then identify a backup of computing device 102 that was performed prior to the cyberattack. In some aspects, this may be the most recent backup (i.e., backup 112c at time t3). Hardening module 104 may then configure kernel driver 110 to disable access to kernel control paths and hashes that are not included in the backup 112c in accordance with a third protection level that comprises greater access restrictions to computing device 102 than the second protection level.

In some aspects, security component 106 may monitor computing device 102 for the cyberattack using machine learning classifier 114. Classifier 114 may be configured to compare attributes of computing device 102 (e.g., memory usage, CPU utilization, number of crashes, presence of files, dependencies, etc.) to cyberattack profiles (e.g., historic system attributes indicative of an attack) and utilize a comparison threshold to evaluate whether computing device 102 is under attack. For example, classifier 114 may be trained using a dataset that is pre-labelled (i.e., attack, no-attack). The dataset may include various attributes of computing devices along with these labels. Classifier 114 may thus learn a set of weights that are applied to an input vector of attributes of computing device 102 (e.g., a dot product). The result of the dot product may be compared to the comparison threshold. If the result is greater than the comparison threshold, machine learning classifier 114 deems that a cyberattack has occurred (i.e., because there is a significant match with a cyberattack profile).

In some aspects, hardening module 104 may adjust the comparison threshold at various protection levels. For example, the second protection level may decrease the comparison threshold of the machine learning algorithm to detect additional irregularities in computing device 102 caused by the cyberattack and/or other cyberattacks. This is analogous to increasing the sensitivity of security component 106.

In some aspects, hardening module 104 may perform a security action to stop the cyberattack. For example, hardening module 104 may remove the files associated with the cyberattack or quarantine them. Hardening module 104 may then determine whether the identified kernel control paths and hashes of the software objects affected by the cyberattack have been normalized (i.e., whether they are working as they normally would in a default setting). In response to determining that the identified kernel control paths and hashes of the software objects have been normalized, hardening module 104 may reconfigure kernel driver 110 to enable access to the identified kernel control paths and hashes of the software objects in accordance with the first protection level.

Figure 2:
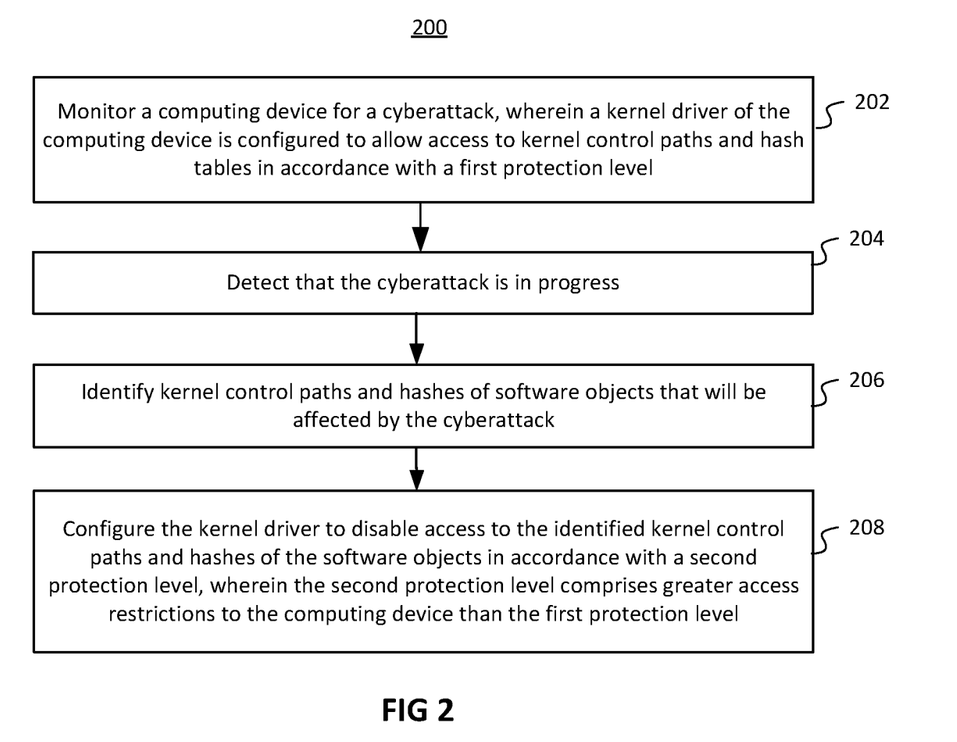
FIG. 2 illustrates a flow diagram of a method for adjusting data protection levels based on system metadata.

FIG. 2 illustrates a flow diagram of method 200 for adjusting data protection levels based on system metadata. At 202, hardening module 104 monitors (e.g., via security component 106) computing device 102 for a cyberattack, wherein kernel driver 110 of computing device 102 is configured to allow access to kernel control paths and hash tables in accordance with a first protection level. At 204, hardening module 104 detects (e.g., via security component 106) that the cyberattack is in progress. While the cyberattack is in progress, method 200 advances to 206, where hardening module 104 identifies kernel control paths and hashes of software objects that will be affected by the cyberattack. At 208, hardening module 104 configures kernel driver 110 to disable access to the identified kernel control paths and hashes of the software objects in accordance with a second protection level, wherein the second protection level comprises greater access restrictions to the computing device than the first protection level.

Figure 3:
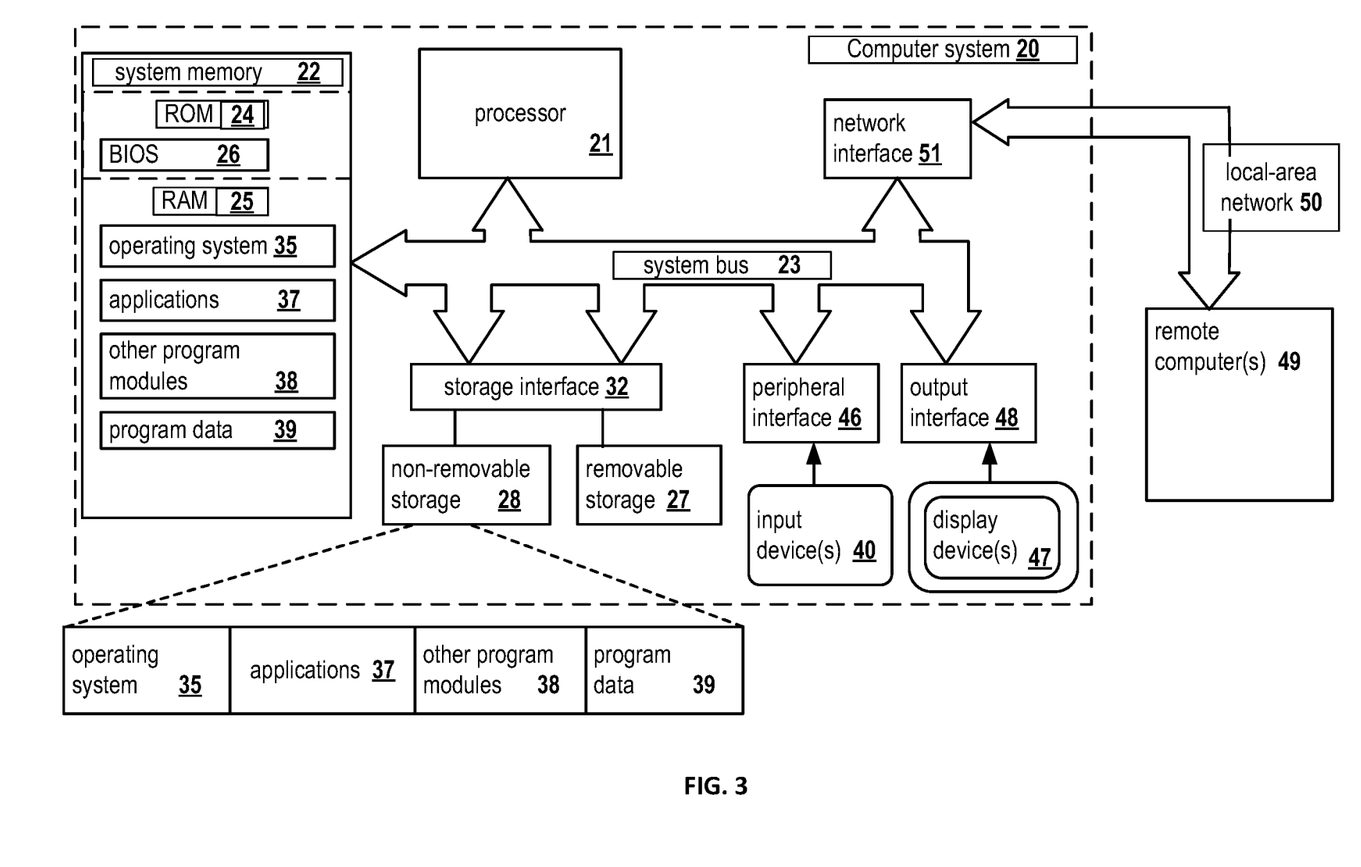
FIG. 3 presents an example of a general-purpose computer system on which aspects of the present disclosure can be implemented.

FIG. 3 is a block diagram illustrating a computer system 20 on which aspects of systems and methods for adjusting data protection levels based on system metadata may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-2 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for adjusting data protection levels based on system metadata, the method comprising:
    monitoring a computing device for a cyberattack, wherein a kernel driver of the computing device is configured to allow access to kernel control paths and hash tables in accordance with a first protection level;
    detecting that the cyberattack is in progress;
    while the cyberattack is in progress,
        identifying kernel control paths and hashes of software objects that will be affected by the cyberattack;
        configuring the kernel driver to disable access to the identified kernel control paths and hashes of the software objects in accordance with a second protection level, wherein the second protection level comprises greater access restrictions to the computing device than the first protection level.

2. The method of claim 1, wherein the kernel driver is configured to follow restrictions of the second protection level for a threshold period of time, further comprising:
    reconfiguring the kernel driver to enable access to the identified kernel control paths and hashes of the software objects in accordance with the first protection level after the threshold period of time has elapsed.

3. The method of claim 2, further comprising:
    training a machine learning algorithm, using a dataset of previous cyberattacks of varying attack timelines, to determine the threshold period of time based on a type of the cyberattack.

4. The method of claim 1, further comprising:
    identifying a backup of the computing device that was performed prior to the cyberattack; and
    configuring the kernel driver to disable access to kernel control paths and hashes that are not included in the backup in accordance with a third protection level that comprises greater access restrictions to the computing device than the second protection level.

5. The method of claim 1, wherein monitoring the computing device for the cyberattack comprises executing a machine learning algorithm configured to compare attributes of the computing device to cyberattack profiles and utilize a comparison threshold to evaluate whether the computing device is under attack.

6. The method of claim 5, wherein the second protection level decreases the comparison threshold of the machine learning algorithm to detect additional irregularities in the computing device caused by the cyberattack and/or other cyberattacks.

7. The method of claim 1, further comprising:
    performing a security action to stop the cyberattack;
    determining whether the identified kernel control paths and hashes of the software objects affected by the cyberattack have been normalized; and
    in response to determining that the identified kernel control paths and hashes of the software objects have been normalized, reconfiguring the kernel driver to enable access to the identified kernel control paths and hashes of the software objects in accordance with the first protection level.

8. The method of claim 1, wherein the first protection level enables full permissions to access to all files in a directory of the computing device, the second protection level disables writing permissions to the files in the directory, and a third protection level disables reading and writing permissions to the files.

9. A system for adjusting data protection levels based on system metadata, comprising:
    a memory; and
    a hardware processor communicatively coupled with the memory and configured to:
        monitor a computing device for a cyberattack, wherein a kernel driver of the computing device is configured to allow access to kernel control paths and hash tables in accordance with a first protection level;
        detect that the cyberattack is in progress;
        while the cyberattack is in progress,
            identify kernel control paths and hashes of software objects that will be affected by the cyberattack;
            configure the kernel driver to disable access to the identified kernel control paths and hashes of the software objects in accordance with a second protection level, wherein the second protection level comprises greater access restrictions to the computing device than the first protection level.

10. The system of claim 9, wherein the kernel driver is configured to follow restrictions of the second protection level for a threshold period of time, and wherein the hardware processor is further configured to:
    reconfigure the kernel driver to enable access to the identified kernel control paths and hashes of the software objects in accordance with the first protection level after the threshold period of time has elapsed.

11. The system of claim 10, wherein the hardware processor is further configured to:
    train a machine learning algorithm, using a dataset of previous cyberattacks of varying attack timelines, to determine the threshold period of time based on a type of the cyberattack.

12. The system of claim 9, wherein the hardware processor is further configured to:
   identify a backup of the computing device that was performed prior to the cyberattack; and
   configure the kernel driver to disable access to kernel control paths and hashes that are not included in the backup in accordance with a third protection level that comprises greater access restrictions to the computing device than the second protection level.

13. The system of claim 9, wherein the hardware processor is further configured to monitor the computing device for the cyberattack by executing a machine learning algorithm configured to compare attributes of the computing device to cyberattack profiles and utilize a comparison threshold to evaluate whether the computing device is under attack.

14. The system of claim 13, wherein the second protection level decreases the comparison threshold of the machine learning algorithm to detect additional irregularities in the computing device caused by the cyberattack and/or other cyberattacks.

15. The system of claim 9, wherein the hardware processor is further configured to:
   perform a security action to stop the cyberattack;
   determine whether the identified kernel control paths and hashes of the software objects affected by the cyberattack have been normalized; and
   in response to determining that the identified kernel control paths and hashes of the software objects have been normalized, reconfigure the kernel driver to enable access to the identified kernel control paths and hashes of the software objects in accordance with the first protection level.

16. The system of claim 9, wherein the first protection level enables full permissions to access to all files in a directory of the computing device, the second protection level disables writing permissions to the files in the directory, and a third protection level disables reading and writing permissions to the files.

17. A non-transitory computer readable medium storing thereon computer executable instructions for adjusting data protection levels based on system metadata, including instructions for:
   monitoring a computing device for a cyberattack, wherein a kernel driver of the computing device is configured to allow access to kernel control paths and hash tables in accordance with a first protection level;
   detecting that the cyberattack is in progress;
   while the cyberattack is in progress,
      identifying kernel control paths and hashes of software objects that will be affected by the cyberattack;
      configuring the kernel driver to disable access to the identified kernel control paths and hashes of the software objects in accordance with a second protection level, wherein the second protection level comprises greater access restrictions to the computing device than the first protection level.

* * * * *